March 25, 1930.  I. F. KINNARD  1,752,094
INDUCTION WATTHOUR METER
Filed March 7, 1927   2 Sheets-Sheet 1
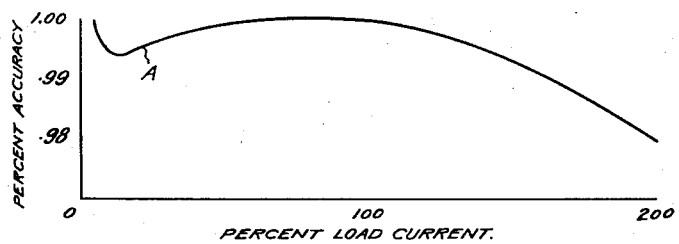
Fig 1
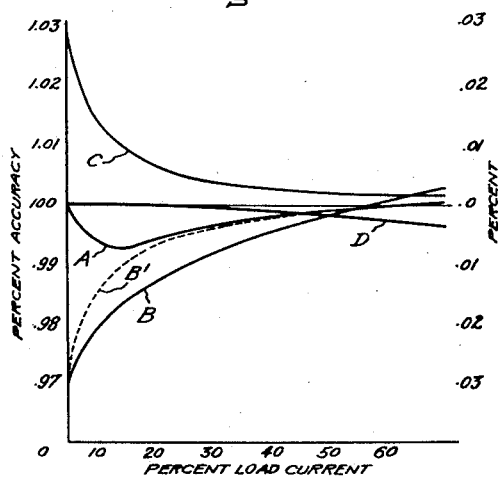
Fig 2
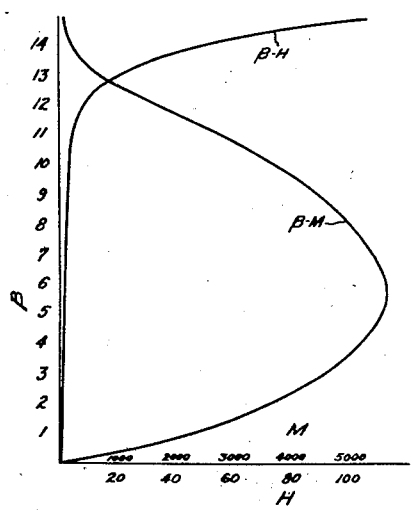
Fig. 3.
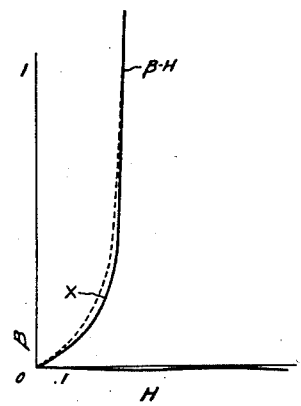
Fig. 3ª
Inventor:
Isaac F. Kinnard,
by
His Attorney.

March 25, 1930.  I. F. KINNARD  1,752,094
INDUCTION WATTHOUR METER
Filed March 7, 1927   2 Sheets-Sheet 2

Inventor:
Isaac F. Kinnard,
by
His Attorney.

Patented Mar. 25, 1930

1,752,094

UNITED STATES PATENT OFFICE

ISAAC F. KINNARD, OF LYNNFIELD, MASSACHUSETTS, ASSIGNOR TO GENERAL ELECTRIC COMPANY, A CORPORATION OF NEW YORK

INDUCTION WATT-HOUR METER

Application filed March 7, 1927. Serial No. 173,248.

My invention relates to electric meters and in particular to induction type watthour meters and its object is to eliminate or reduce the measurement error of such meters occurring at light loads.

The light load error of this type of meter is caused by the fact that at very light loads corresponding to very low magnetization of the current core the permeability of the iron is so low as compared to what it is at normal loads that the current flux is correspondingly low in comparison to the magnetizing current. As a result the torque component of the current flux at light loads is not sufficient to operate the meter at the proper speed. This has been partially corrected heretofore by providing the meter with an auxiliary torque commonly called the light load adjustment torque supplied from the voltage magnet. However, due to the fact that this auxiliary torque is constant whereas the primary cause of the error is not a constant factor, a portion of the error remains. This error gives rise to the characteristic light load droop of the ordinary induction watthour meter. I have discovered that this remainnig error may be very materially reduced by a novel design of the magnetic circuit of the meter which takes advantage of the varying permeability of magnetic materials at different densities below saturation.

In carrying my invention into effect I prefer to reduce the cross-section of a portion of the current core so that at light loads it operates at a flux density where the permeability is considerably higher than usual. The resultant permeability characteristics of the path of the current flux is modified sufficiently to substantially wipe out the remaining light load error. This reduction of the current core should not be sufficient to cause saturation at higher loads since this would introduce additional errors at such higher loads.

Figure 4:
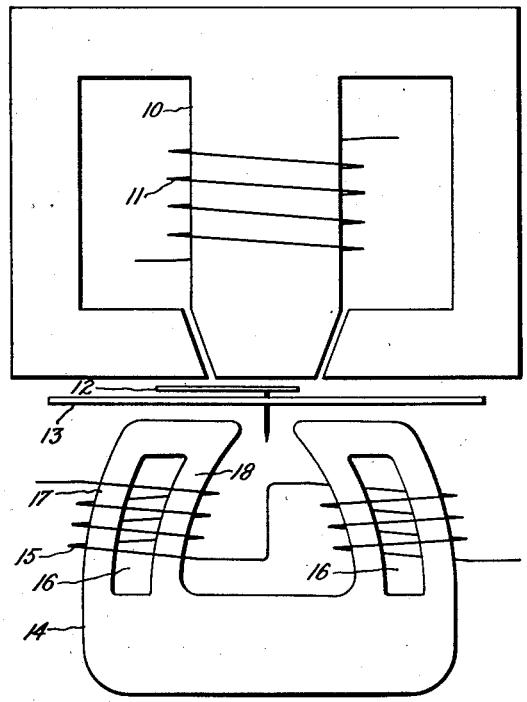
Figure 5:
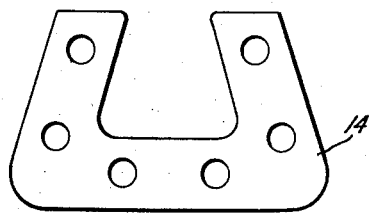
Figure 6:
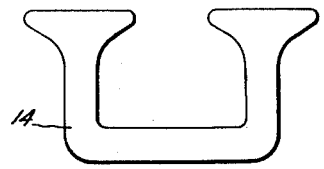
Figure 7:
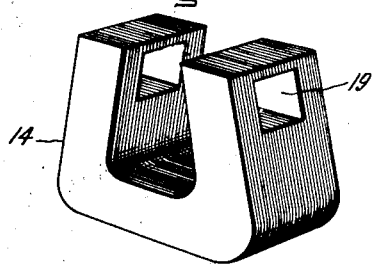

The features of my invention which are believed to be novel and patentable will be pointed out in the claims appended hereto. For a better understanding of my invention, reference is made in the following description to the accompanying drawing in which Fig. 1 represents the characteristic load accuracy curve of the usual induction watthour meter; Fig. 2 shows by way of curves an analysis of the light load portion of the load accuracy curve; Fig. 3 shows saturation and permeability curves of silicon steel such as is used in the magnet circuit of meters; Fig. 3ª shows the lower part of the saturation curve on a larger scale; Fig. 4 shows the type of meter to which my invention has been applied and a preferred design of the current core according to the invention; and Figs. 5, 6 and 7 show other modifications of the current core coming under the invention.

Referring to Fig. 1, this shows the characteristic load accuracy curve of the ordinary induction watthour meter obtained by operating the meter at rated voltage and frequency and varying the current. It has been the practice to adjust the light load torque of the meter so that the meter is accurate at about 5% and 100% loads. This seems to give the best overall accuracy. Below 5% load the curve has not been plotted since it becomes rather indefinite due to starting conditions and does not enter into the present problem. The light load droop is present and is a maximum at about 15% load. The overload droop is shown. The overload droop does not enter into the present problem except that in practicing the invention it is desirable that the necessary precautions are taken so as not to operate the current core too close to saturation since if this is done the overload droop of the ordinary meter would be increased. In a copending application, Serial No. 151,292, filed November 29, 1926, I have described how another application of the principles underlying the invention have been utilized to very materially reduce the overload droop of this type of meter. In said application parallel magnetic circuits of the meter are provided for the potential flux, such circuits having cross sections which permit operation at different permeabilities below saturation. One circuit carries the operating flux of the meter and the other circuit carries an inactive flux. By suitable proportioning the permeabilities of these parallel magnetic circuits the active flux is caused to increase with the increase in voltage to the extent necessary to compensate for voltage flux damping errors.

In the application of my invention for the correction of the light load droop error different series connected portions of the current core are made of different cross-section but both operate below saturation over the entire range of load for which the meter is intended. As a result, the different portions operate at materially different permeabilities over the light load range and a more nearly uniform average permeability of the magnetic circuit, considered as a whole, is thus obtained than would be the case if the core were of uniform cross-section. The resultant permeability of the current core is thus increased somewhat over the light load range as compared to the resultant permeability at higher loads and the light load droop of the meter is substantially eliminated. In Fig. 2 I have shown the light load portion of this curve at A together with other curves which show why the light load droop exists. Curve B is plotted from the ratio of current flux to current on the basis that at 100% load this ratio equals 100%. For curves A and B the ordinates at the left are used. Curve C is plotted from the ratio of corrective light load adjustment torque to curernt, plotted in percent from the 100% accuracy line, the ordinates at the right being used. The light load adjustment torque is constant so that this curve approaches the 100% accuracy line in the form of a true hyperbola, it being merely a constant divided by the percent load. Curve D is plotted from the ratio of current flux damping torque to current. The current flux damping torque varies as the square of the current. It is quite negligible at light loads but has been shown here in order to make the analysis complete. This curve is plotted in percent from the 100% accuracy line, the ordinates at the right being used. From these curves it may be seen why the light load droop exists. It is because the curve B does not have the same shape as the curve C. Curve C approaches the 100% accuracy curve much faster than curve B where the light load error originates. It is evident that since the light load adjustment torque is constant the shape of curve C can not be changed. However, if it were possible to change the shape of the current flux curve B to that indicated by the dotted line curve B', it is evident that the light load droop would be eliminated. The purpose of the present invention is to change the shape of the curve B so that it will conform as near as possible to a true hyperbola corresponding to the theoretically correct curve B'.

Fig. 3 shows the saturation curve $\beta$—H and the permeability curve $\beta$—M for silicon steel such as is used in the magnetic circuits of electric meters. The magnetic circuit of the meter operates well below saturation even up to 400% load and at 15% load where the light load droop occurs the magnetic material operates at such a low flux density that it is desirable, in explaining the invention, to plot the lower portion of the saturation curve on a larger scale, as shown in Fig. 3ª. The lower part of the saturation curve as shown in Fig. 3ª varies quite materially from a straight line and in the usual meter at about 15% load current the degree of saturation of the current core comes below the straight part of the curve such as at the point X. According to my invention a portion of the magnetic circuit is reduced in cross-section so that for a given magnetizing current corresponding to the light load range this section operates at a higher flux density, thereby obtaining the benefit of a higher and more nearly constant resultant permeability. The saturation curve of the circuit is modified in some such manner as is indicated by the dotted line curve of Fig. 3ª so that for the same magnetizing current the meter operates higher up on the bend of the curve where there is less curvature and at the same time the actual flux is increased due to the higher average permeability.

In describing my invention I have advanced a theory which is believed to be a correct one, although just what happens is rather obscure, and I appreciate that this theory may not be entirely correct or complete. However, I have demonstrated by actual practice and careful tests that the light load droop of induction watthour meters may be substantially eliminated by the use of this invention as described.

Fig. 4 shows the invention as applied to an induction watthour meter. In this figure, 10 represents the potenial core and 11 its exciting winding. 12 represents the light load adjusting plate which merely lags a portion of the potential flux slightly to produce the torque corresponding to curve C, Fig. 2. 13 represents the rotatably mounted disc armature. 14 represents the current core, and 15 the current winding thereon. This meter is of the usual construction with the exception of the openings provided at 16 which are provided in accordance with my invention to modify the permeability and saturation characteristics of the current flux circuit in the manner previously explained. The sections of the material at 17 and 18 now operate over a higher permeability range than the remainder of the core. By means of this feature I have found that I can very closely approximate the ideal curve B', Fig. 2, over the light load range of the instrument and produce a watthour meter in which the load accuracy curve over the light load range conforms approximately to the 100% accuracy line of Fig. 2. This is accomplished without decreasing the higher load accuracy of the meter. On overloads the sections 17 and 18 operate well below saturation so that the overload accuracy of the meter is not impaired. The average permeability of the current magnet is more nearly constant than if made of uniform cross-section.

Alternative designs of the current core for producing the same result are shown in Figs. 5, 6 and 7. In Figs. 5 and 6 the core is reduced in cross-section in the same dimensions as in Fig. 4. In Fig. 7 it is reduced in cross-section by leaving out sections of the laminations as shown at 19.

In accordance with the provisions of the patent statutes, I have described the principle of operation of my invention, together with the apparatus which I now consider to represent the best embodiment thereof; but I desire to have it understood that the apparatus shown and described is only illustrative and that the invention may be carried out by other means.

What I claim as new and desire to secure by Letters Patent of the United States, is:

1. In an induction type watthour meter having a current flux magnetic circuit of sufficient minimum cross-section to operate below saturation over the entire range of current flux for which the meter is intended to operate, the method of reducing the light load droop of such meters which consists in simultaneously operating different portions of the current flux magnetic circuit at materially different permeabilities over the light load current range of the meter to thereby obtain a more nearly uniform average permeability of the magnetic circuit considered as a whole than would be the case if all parts thereof were simultaneously operated at the same flux density.

2. The method of correcting the accuracy load curve of induction type watthour meters which consists in operating different portions of the current flux magnetic circuit at materially different flux densities below saturation over the entire current flux density range for which the meter is intended to operate to thereby obtain a more nearly uniform average permeability in the magnetic circuit considered as a whole than the permeabilities of the different portions over such range.

3. The method of improving the load accuracy curve of induction type watthour meters which consists in reducing the variation in permeability of the current flux magnetic circuit with variations in flux density by operating different portions of such magnetic circuit at different flux densities below saturation to thereby obtain a more nearly uniform average permeability of the magnetic circuit considered as a whole.

4. An induction type watthour meter having a current flux magnetic circuit of sufficient cross-section at its smallest point to operate below saturation over the entire range of current flux for which the meter is intended to operate and having different parts of said magnetic circuit proportioned to simultaneously operate at materially different permeabilities over the light load range of current flux operation.

5. An induction type watthour meter having a current flux magnetic circuit of sufficient cross-sectional area at its smallest portion to operate below saturation over the entire range of current flux for which the meter is intended to operate, different series connected portions of said magnetic circuit having materially different permeabilities when subjected to the light load range of current flux.

6. An induction watthour meter having a current flux magnetc circuit comprised of sections of different cross-sectional area connected in series relation in the flux path, the section of smallest cross-sectional area being such as to operate below saturation over the entire range of current flux for which the meter is intended to operate and at a materially higher permeability than the remaining portion of the magnetic circuit over the light load range of current flux.

In witness whereof, I have hereunto set my hand this fourth day of March, 1927.

ISAAC F. KINNARD.